July 20, 1965     S. E. CORDER     3,195,352
TESTING GAUGE
Filed April 29, 1963
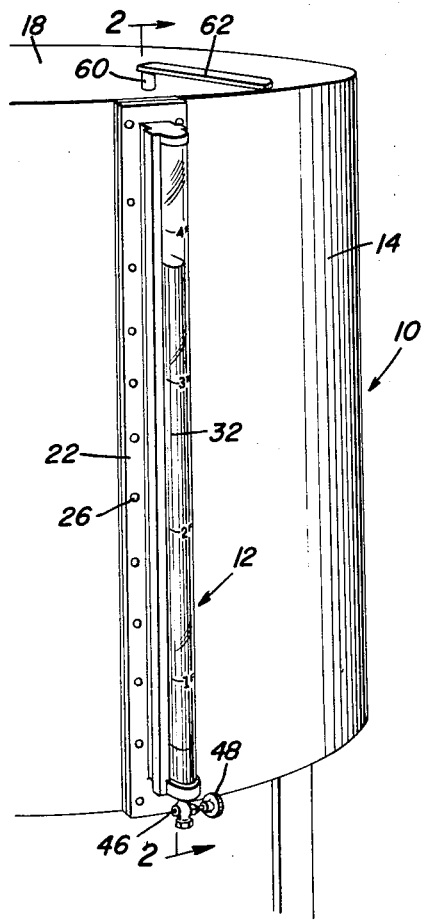
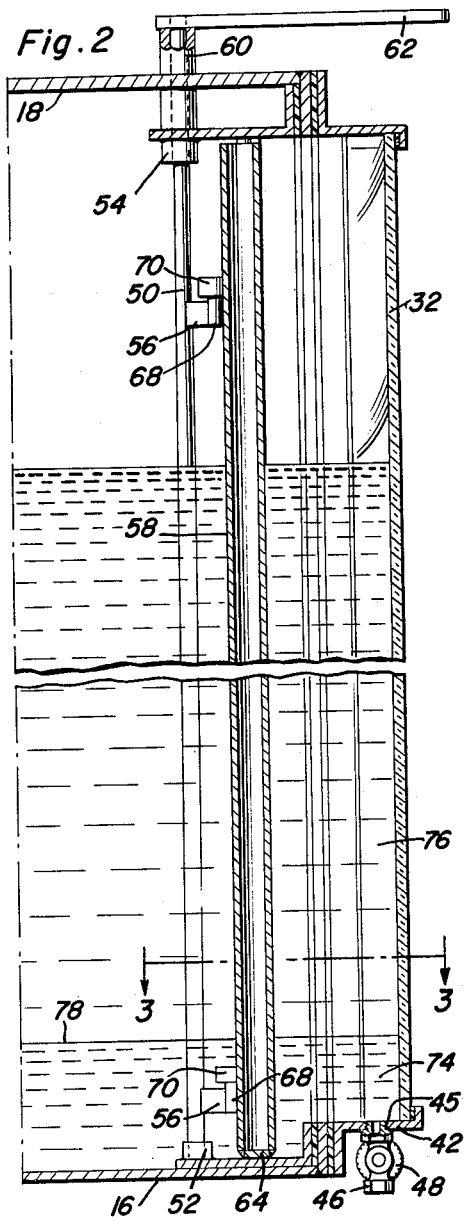
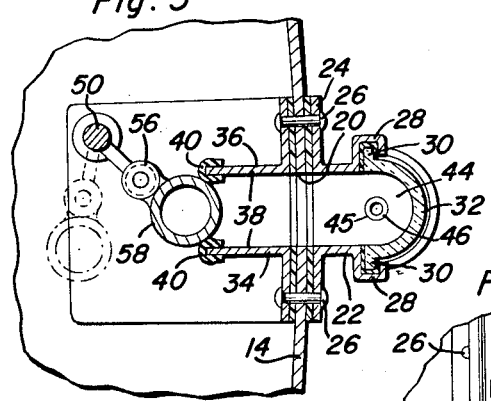
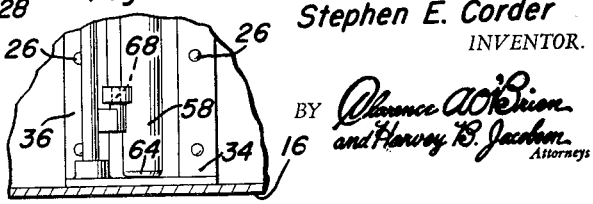
Stephen E. Corder
INVENTOR.

United States Patent Office 3,195,352
Patented July 20, 1965

3,195,352
TESTING GAUGE
Stephen E. Corder, 157 Fillmore St., Coalinga, Calif.
Filed Apr. 29, 1963, Ser. No. 276,302
7 Claims. (Cl. 73—328)

This invention relates to a novel and useful testing gauge and more specifically to a supply or reservoir tank construction including means of ascertaining the percentage of the components of an emulsion being agitated within the tank.

Although it is to be understood that the testing gauge of the instant invention may be incorporated into the construction of storage tanks and the like of various types and adapted to contain various materials, it is particularly well adapted for use in the oil industry.

Oil wells frequently yield both water and oil and it is the usual practice that the entire yield be pumped to the surface of the well to be received within storage tanks and the like. For many reasons it is oftentimes desirable to be able to accurately ascertain the percentage of oil in a storage tank in order that either that quantity of oil may be pumped from above the water or the remaining quantity of water may be pumped from below the oil. In this manner, the water and oil may be separately pumped from a main storage tank into other appropriate storage means.

The testing gauge of the instant invention also includes means by which the percentage of the oil in the emulsion within the tank may be readily ascertained even though the emulsion within the tank is being agitated with sufficient vigor to prevent stratification of the various components of the emulsion.

The testing gauge also enables a sample of each of the components of the emulsion to be separately taken from the tank.

The main object of this invention is to provide a testing gauge for a storage tank that will enable the percentages of the components of a stratified mixture of liquid in the tank to be readily ascertained.

A further object of this invention is to provide a testing gauge which will enable the percentages of the components of an emulsion within the tank continuously being agitated to also be readily ascertained.

Still another object of this invention is to provide a testing gauge constructed in a manner whereby samples of the components of a stratified mixture of liquids within the tank may be separately drawn from the tank with little effort and without completely draining the tank.

A final object of this invention to be specifically enumerated herein is to provide a testing gauge in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary perspective view of a storage tank shown with the testing gauge of the instant invention mounted thereon;

FIGURE 2 is an enlarged fragmentary sectional view taken substantially upon the plane indicated by the section line 2—2 of FIGURE 1;

FIGURE 3 is a fragmentary horizontal sectional view taken substantially upon the plane indicated by the section line 3—3 of FIGURE 2; and FIGURE 4 is a fragmentary vertical sectional view showing the manner in which the partition defining means of the testing gauge is movably mounted in the tank.

With attention now directed more specifically to the drawings the numeral 10 generally designates the supply tank with which the testing gauge generally referred to by the reference numeral 12 of the instant invention is operatively associated.

The tank 10 includes a side wall 14, a bottom wall 16, and a top wall 18. The tank 10 is provided with an inlet and an outlet which are not shown and it will be noted that the wall 14 has a vertically extending slot or opening 20 formed therein.

A pair of mounting flanges 22 and 24 are secured to the wall 14 in any convenient manner such as by fasteners 26 and include opposing channel portions 28 in which the mounting flanges 30 of an elongated semi-cylindrical window 32 are secured.

A second pair of angle members 34 and 36 are also secured to opposite sides of the window or opening 20 on the inside of the wall 14 by means of the fasteners 26. The angle members 34 and 36 include inwardly directed leg portions 38 which have seals 40 mounted on their inner edge portions.

The bottom 16 includes a raised portion 42 disposed at the lower end of the pocket 44 defined between the flanges 38 and the mounting flanges 22 and 24. The raised portion 42 has an outlet opening 45 formed therein in which a drain petcock 46 is secured. The drain petcock includes a manually operable valve member 48 whereby the liquid within the pocket 44 may be drained therefrom.

A mounting shaft 50 is journaled between a pair of journals 52 and 54 supported from the wall 14 and the bottom and top walls 16 and 18 and is provided with a pair of arms 56 projecting generally radially outwardly of the shaft 50. A generally cylindrical partition member is mounted on the outer ends of the arms 56 and is designated by the reference numeral 58. The upper end of the shaft 50 projects upwardly through the upper end of the portion 60 of the journal 54 which projects above the top wall 18 and has an actuating handle 62 mounted thereon whereby the shaft 50 may be oscillated to move the partition defining member between the positions illustrated in solid and phantom lines in FIGURE 3 of the drawings.

It is to be noted that the lower end of the cylindrical member 58 is provided with a seal 64 and therefore that the lower end of the pocket 44 is closed as well as the inner edge portion thereof by means of the cylindrical member 58 when the cylindrical member 58 is disposed as illustrated in solid lines in FIGURE 3 of the drawings.

The free ends of the arms 56 are provided with stub shaft members 68. These stub shaft members 68 are wedgingly received in journals 70 supported from the cylindrical member 58.

If it is desired, suitable gasket material may be used between the wall 14 and the flanges 22 and 24 as well as the angle members 36 and 38.

In operation, it may be seen from FIGURE 2 of the drawings that the interior of the tank is filled with a quantity of water 74 over which there is disposed a quantity of oil 76. While an accurate determination of the percentage of the water and oil in the tank 10 may be readily ascertained if the two components have been allowed to stratify and define a separation level 78. Should a mixture of water and oil be pumped into the tank 10, the agitation of the emulsion will prevent stratification of the components thereof and thus render it impossible to determine the percentages of the water and oil in the emulsion. However, at any time the cylindrical member 58 may be moved to the closed position illustrated in solid lines in FIGURE 3 of the drawings in order that that portion of the effluent within the pocket 44 will be allowed to stratify in order that the separation level may be readily ascertained. In addition, samples from the pocket 44 may be withdrawn through the petcock 46. If it is desired, the components may be allowed to stratify within the pocket 44 before the samples are taken in order that the water 74 may first be withdrawn. Then, after all of the water has been withdrawn from the pocket 44, the oil 76 may be withdrawn therefrom.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, a supply tank including at least one upstanding wall, means defining upright, vertically elongated, and at least semi-transparent window means in said one wall extending throughout a substantial majority of the vertical extent of said one wall and for viewing the separation level between a lower layer of heavy fluid and an upper layer of lighter fluid in said tank, said tank including means defining an upstanding emulsion stratifying pocket extending vertically through at least a substantial portion of the vertical extent of said window defining means and whose outer extremity is defined and closed by said window defining means, and upright partition defining means movably mounted in said tank inwardly of said window defining means for movement into and out of cooperable engagement with said pocket defining means closing the inner extremity of said pocket and sealing said socket from the remainder of the interior of said tank from its lower end portion to its upper end portion, said pocket being disposed between and defined, at least in part by, said partition defining means and said window defining means whereby said partition defining means may be actuated to seal the mixture of heavy and light liquids in said pocket from the remainder of the interior of said tank and said liquids in said pocket may be allowed to quickly stratify in order that the separation level of the mixture within said pocket may be quickly determined even as the mixture within the tank outside the pocket is being agitated to an extent that it cannot fully stratify.

2. The combination of claim 1 wherein said tank includes a bottom wall including a portion defining a bottom for said pocket, said portion of said bottom having an outlet drain therein.

3. The combination of claim 1 wherein said window means includes indicia visible from the exterior of said tank for accurately determining the level of separation registered therewith.

4. The combination of claim 1 wherein said pocket defining means includes a pair of upright partition members disposed on opposite sides of said window defining means and projecting inwardly of said tank from said one wall thereof, said partition defining means being movable into sealed engagement with the innermost extremities of said partition members.

5. The combination of claim 4 wherein the innermost extremities of said partition members include seal means with which said partition defining means is engageable.

6. The combination of claim 1 wherein said partition defining means is mounted on arm means extending generally radially outwardly of an upright shaft journaled in said tank for rotation about its longitudinal axis, the upper end of said shaft projecting upwardly through the upper end of said tank and the upper extremity thereof being provided with handle means for effecting rotation of said shaft from the exterior of said tank.

7. The combination of claim 1 wherein said pocket defining means includes a pair of upright partition members disposed on opposite sides of said window means and projecting inwardly of said tank from said one wall thereof, said partition defining means being movable into sealed engagement with the innermost extremities of said partition members, said tank including a bottom wall including a portion defining a bottom for said pocket, said portion of said bottom having an outlet drain therein.

References Cited by the Examiner
UNITED STATES PATENTS

| | | | |
|---|---|---|---|
| 200,138 | 2/78 | Heard | 73—332 |
| 318,284 | 5/85 | Ochwadt | 73—334 |
| 376,255 | 1/88 | Parker et al. | 73—332 X |
| 738,315 | 9/03 | Gehre | 73—332 |
| 1,250,321 | 12/17 | Kitts | 73—333 |
| 1,784,973 | 12/30 | Preston | 73—323 |
| 2,835,269 | 5/58 | Seymour | 251—298 X |

FOREIGN PATENTS 5,408  6/79  Germany

ISAAC LISANN, *Primary Examiner.*